United States Patent
Tsai et al.

(10) Patent No.: US 8,793,563 B2
(45) Date of Patent: Jul. 29, 2014

(54) WIRELESS APPARATUS AND METHOD FOR DE-MASKING A PACKET

(75) Inventors: Tsung-Yu Tsai, Tainan County (TW); Chun-Che Chien, Taipei (TW); Yi-Ting Lin, New Taipei (TW)

(73) Assignee: Institute for Information Industry, Taiwan (TW)

(*) Notice: Subject to any disclaimer, the term of this patent is extended or adjusted under 35 U.S.C. 154(b) by 153 days.

(21) Appl. No.: 13/367,245

(22) Filed: Feb. 6, 2012

(65) Prior Publication Data

US 2012/0204085 A1 Aug. 9, 2012

Related U.S. Application Data

(60) Provisional application No. 61/440,406, filed on Feb. 8, 2011.

(51) Int. Cl.
*H03M 13/00* (2006.01)
*H04L 1/00* (2006.01)

(52) U.S. Cl.
CPC ............ *H04L 1/0045* (2013.01); *H04L 1/0061* (2013.01)
USPC ............................ 714/807; 714/752; 714/758

(58) Field of Classification Search
USPC .......................................... 714/807, 752, 758
See application file for complete search history.

(56) References Cited

U.S. PATENT DOCUMENTS

| 8,028,217 B2* | 9/2011 | Pietraski et al. ............... 714/752 |
| 2008/0104475 A1 | 5/2008 | Pietraski et al. |

FOREIGN PATENT DOCUMENTS

| KR | 20090083433 A | 8/2009 |

OTHER PUBLICATIONS

Office Action issued by the KR Patent Office for the KR counterpart to the present patent application, Apr. 17, 2013, 7 pages including translation.

* cited by examiner

*Primary Examiner* — Fritz Alphonse
(74) *Attorney, Agent, or Firm* — Skaar Ulbrich Macari, P.A.

(57) ABSTRACT

A wireless apparatus and a method thereof are provided. The wireless apparatus comprises a receiving unit and a processing unit. The receiving unit is configured for receiving a packet which comprises a data portion and a cyclic redundancy check portion from the base station. The processing unit connected to the receiving unit which is configured for generating a de-masked packet by de-masking the cyclic redundancy check portion and at least one selected bit of the data portion by a plurality of predetermined bits, determining that the de-masked packet pass a cyclic redundancy check, and accepting the packet after the determination.

6 Claims, 5 Drawing Sheets

WIRELESS APPARATUS AND METHOD FOR DE-MASKING A PACKET

PRIORITY

This application claims the benefit of U.S. Provisional Application Ser. No. 61/440,406 filed on Feb. 8, 2011, which is hereby incorporated herein by reference in its entirety.

FIELD

The present invention relates to a wireless apparatus belonging to a network system and a method for de-masking a packet. More particularly, the present invention relates to a wireless apparatus and a method for de-masking a packet based on cyclic redundancy check.

BACKGROUND

With the advancement of the science and technologies, communication network technologies have been developed in succession to meet various kinds of demands of users.

The basic idea of a network system is that wireless apparatuses and base stations are able to transmit packets with each other without causing confusion and ambiguity. That is, a wireless apparatus/base station needs the ability to determine whether a packet is designated for itself or not. However, as the number of the wireless apparatuses/base stations grows, prior methods for determining whether a packet belongs to some particular wireless apparatus may be no longer functional. With the shortcoming of prior methods, a network system has to put a limit on the number of the wireless apparatuses/base stations that it can accommodate to prevent from causing confusion and ambiguity.

For many wireless communication applications, the growing of a network system is inevitable. Therefore, a mechanism for wireless apparatuses/base stations to identify their own packets without causing confusion and ambiguity is in an urgent need for a growing network system.

SUMMARY OF THE INVENTION

To solve the aforesaid problem, the present invention provides a wireless apparatus and a method for de-masking a packet thereof.

The wireless apparatus of the present invention belongs to a network system and comprises a receiving unit and a processing unit. The receiving unit is configured for receiving a packet from a base station of the network system. The packet comprises a data portion and a cyclic redundancy check portion. The processing unit is electronically connected to the receiving unit and configured for generating a de-masked packet by de-masking the cyclic redundancy check portion and at least one selected bit of the data portion by a plurality of predetermined bits. The processing unit is further configured for determining that the de-masked packet pass a cyclic redundancy check and then accepting the packet after the determination.

The method for de-masking a packet of the present invention is for use in a wireless apparatus of a network system. The network system comprises a base station and the wireless apparatus. The method comprises the steps of: (a) receiving, by the wireless apparatus, the packet from the base station, the packet comprising a data portion and a cyclic redundancy check portion; (b) generating, by the wireless apparatus, a de-masked packet by de-masking the cyclic redundancy check portion and at least one selected bit of the data portion by a plurality of predetermined bits; (c) determining, by the wireless apparatus, that the de-masked packet passes a cyclic redundancy check; and (d) accepting, by the wireless apparatus, the packet.

The present invention can perform masking and de-masking not only to the bits in the CRC portion but also to the at least one selected bit in the data portion by the predetermined bits. Since masking and de-masking are not limited to bits in the CRC portion, the network system is able to accommodate more wireless apparatuses comparing to prior art.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the wireless apparatus and the method for de-masking a packet according to the present invention will be explained with reference to example embodiments thereof. However, these example embodiments are not intended to limit the present invention to any specific environment, example, embodiment, applications, or particular implementations described in these example embodiments. Therefore, description of these example embodiments is only for purpose of illustration rather than to limit the present invention. It should be appreciated that, in the following example embodiments and the attached drawings, elements unrelated to the present invention are omitted from depiction.

Figure 1A:
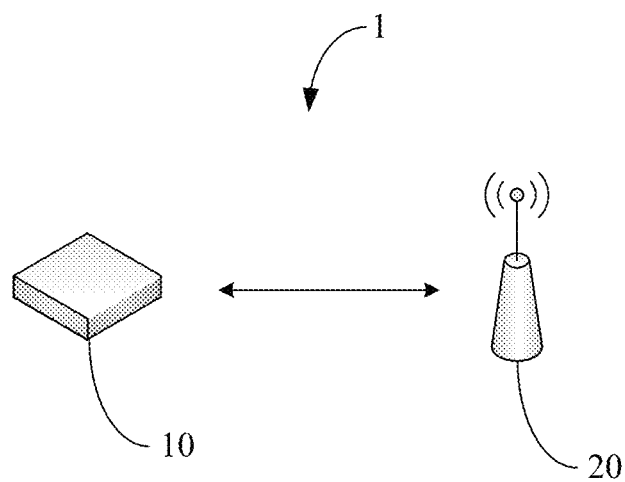
FIG. 1A and FIG. 1B are a schematic view and a functional block diagram of a network system according to the present invention.
Figure 1B:
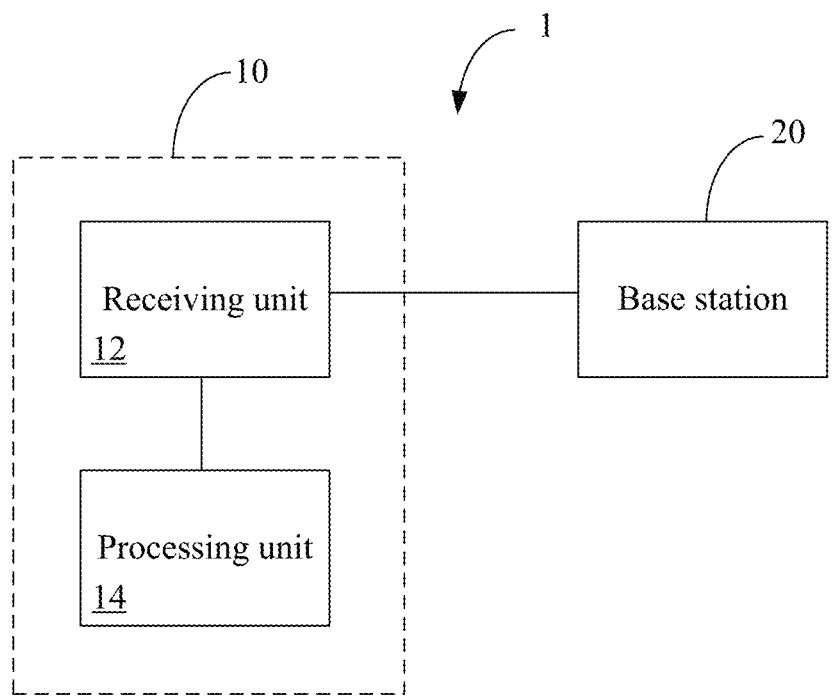

A schematic view and a functional block diagram of a network system 1 according to the present invention are shown in FIG. 1A and FIG. 1B respectively. The network system 1 comprises a wireless apparatus 10 and a base station 20. The wireless apparatus 10 may be a machine-to-machine (M2M) apparatus.

Figure 2:
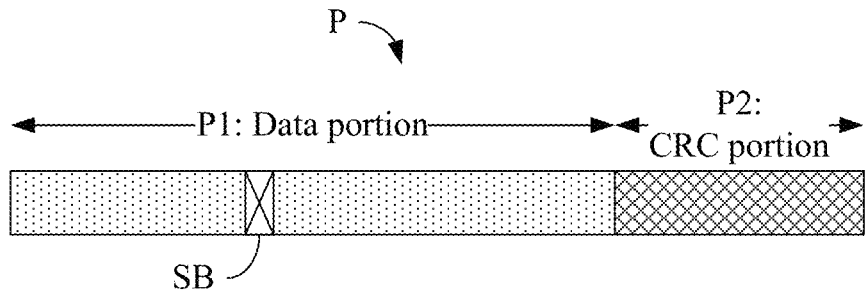
FIG. 2 is a structure of a packet of a first embodiment according to the present invention.

FIG. 2 illustrates a structure of a packet P of a first embodiment according to the present invention, wherein the packet P comprises a data portion P1 and a cyclic redundancy check (CRC) portion P2. When the base station 20 intends to communicate with the wireless apparatus 10, the base station 20 creates and transmits the packet P to the wireless apparatus 10.

The wireless apparatus 10 comprises a receiving unit 12 and a processing unit 14, wherein the receiving unit 12 and the processing unit 14 are electrically connected to each other. The receiving unit 12 receives the packet P transmitted from the base station 20. The processing unit 14 generates a de-masked packet by de-masking the CRC portion P2 and a selected bit SB of the data portion P1 by a plurality of predetermined bits. It is noted that the predetermined bits are unique in the network system 1 and both the base station 20 and the wireless apparatus 10 know that the predetermined bits are designated for the wireless apparatus 10.

The processing unit 14 further determines whether the de-masked packet passes a cyclic redundancy check, which may be accomplished by using a CRC polynomial. People skilled in the art will appreciate how to perform cyclic redundancy check by a CRC polynomial, so the details are not described herein. If the de-masked packet does not pass the cyclic redundancy check, it means that the packet P is not for the wireless apparatus 10 and hence the processing unit 14 drops the packet P. On the contrary, if the de-masked packet passes the cyclic redundancy check, it means that the packet P is for the wireless apparatus 10 and hence the processing unit 14 accepts the packet P.

Preferably, a selected position in the data portion P1 for placing the selected bit SB is chosen carefully based on a selection procedure. In the selection procedure, the selected bit SB at the selected position can be 0 or 1 and the bits in the rest positions are set to be 0. Therefore, given a selected position, there are 2 possible bit streams. Then, 2 redundancies are derived by applying the CRC polynomial to each of the possible bit streams in the selection procedure. The derived redundancies form a first vector space. In the selection procedure, a second vector space is further formed by a plurality of redundancies by applying the CRC polynomial to each of all possible bit streams in the CRC portion. If the first vector space and the second vector space do not overlap, the selected bit SB in the selected position in the data portion P1 can be used for masking (from the viewpoint of the base station 20) and de-masking (from the viewpoint of the wireless apparatus 10).

Figure 3:
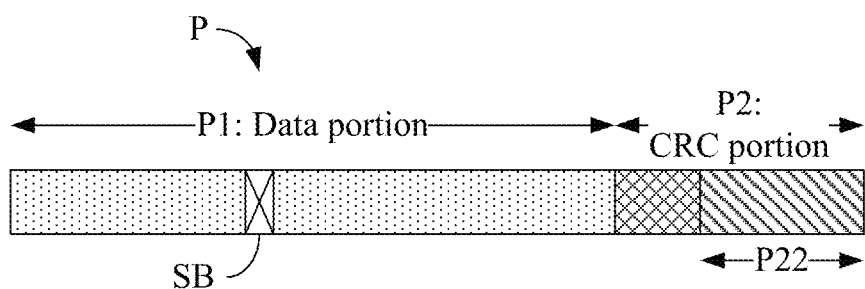
FIG. 3 is a structure of a packet of a second embodiment according to the present invention.

Referring to FIG. 3, there is shown a structure of a packet P of a second embodiment according to the present invention. In this embodiment, the CRC portion P2 is defined with a station identification (STID) masked field P22 and the station identification (STID) masked field P22 comprises a plurality of bits. If the network system 1 complies with the IEEE 802.16p standard, a length of the packet P is 56 bits, the data portion P1 has 40 bits, the CRC portion P2 has 16 bits, and the station identification (STID) masked field P22 is the 12 least significant bits in the CRC portion P2.

In this embodiment, the wireless apparatus 10 has an identity comprising an STID and an extended station identification (ESTID). If the STID is of 12 bits and the ESTID is of 1 bit, a total length of the identity is 13 bits. It means that $2^{13}$ wireless apparatus at most can be accommodated in the network system 1 without causing ambiguity. In this embodiment, the processing unit 14 de-masks the bits in the STID-masked field P22 by the STID of the wireless apparatus 10 and de-masks the selected bit SB in the data portion P1 by the ESTID.

Figure 4:
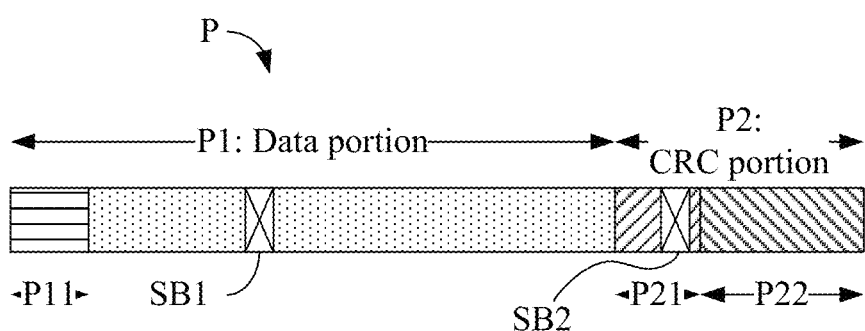
FIG. 4 is a structure of a packet of a third embodiment according to the present invention.

Please refer to FIG. 4, in which a structure of a packet P in a third embodiment according to the present invention is shown. In this embodiment, the CRC portion P2 is defined with an STID-masked field P22 and a non-STID-masked field P21. In addition, the STID-masked field P22 comprises a plurality of bits, while the non-STID-masked field P21 comprises at least one bit. For example, when the network system 1 complies with the IEEE 802.16p standard, the STID-masked field P22 comprises 12 bits and the non-STID-masked field P21 comprises 4 bits.

In this embodiment, there are two selected bits SB1 and SB2, wherein the selected bit SB1 is located in the data portion P1 and the selected bit SB2 is located in the non-STID-masked field P21 of the CRC portion P2. The wireless apparatus 10 has an identity comprising an STID and an ESTID. The processing unit 14 de-masks the bits in the STID-masked field P22 by the STID of the wireless apparatus 10 and de-masks the two selected bits SB1 and SB2 in the data portion P1 and in the non-STID-masked field P21 by the ESTID of the wireless apparatus 10. Since there are 14 bits (the two selected bits SB1 and SB2 and 12 bits from the STID-masked field P22) are used for masking and de-masking, $2^{14}$ wireless apparatus at most can be accommodated in the network system 1 in this embodiment.

The selected positions for placing the two selected bits SB1 and SB2 are chosen based on a selection procedure. In the selection procedure, each of the selected bits SB1 and SB2 can be 0 or 1 and the bits in the rest positions are set to be 0. Hence, given two selected positions, there are $2^2$ possible bit streams. Then, $2^2$ redundancies are derived by applying a CRC polynomial to each of the possible bit streams in the selection procedure. The redundancies form a first vector space. In the selection procedure, a second vector space is further formed by a plurality of redundancies by applying the CRC polynomial to each of all possible bit streams in the CRC portion. If the first vector space and the second vector space do not overlap, the two selected bit SB1 and SB2 can be used in the data portion P1 and non-STID-masked field P21.

In some cases, the first vector space may be partially overlapped with the second vector space. For those cases, the two selected bit SB1 and SB2 can still be used with additional check; however, another additional check is required. Specifically, the processing unit 14 further determines whether the packet P passes the another check. If the packet P passes the another check, it means that the packet P is for the wireless apparatus 10 and the processing unit 14 accepts the packet P. On the contrary, if the packet P does not pass the another check, it means that the packet is not for the wireless apparatus 10 and the processing unit 14 then discards the packet P.

The another check may be performed according to a length of the packet P or according to a content of the type field. In this embodiment, the data portion P1 further comprises a 4-bit type field P11 for identifying an attribution (i.e. unicast or multicast) of the packet P. For example, if the attribution shows that the packet P is a unicast one, the content of the 4-bit type field P11 is in a range of 0000~0100 and the length of the packet is 23 bits. If the attribution shows that the packet P is multicast one, the content of the 4-bit type field P11 is in a range of 0101~1000 and the length of the packet is 21 bits.

According to the above descriptions, it is learned that the base station 20 and the wireless apparatus 10 of the present invention can respectively perform masking and de-masking not only to the bits in the CRC portion but also to the at least one selected bit in the data portion by the predetermined bits. Moreover, additional bits, such as bits in the non-STID-masked field P21 of the CRC portion, can be used for masking and de-masking as well. The another check may be further applied after the process of de-masking. Since masking and de-masking are not limited to bits in the CRC portion, the network system 1 is able to accommodate more wireless apparatuses comparing to prior art.

Figure 5:
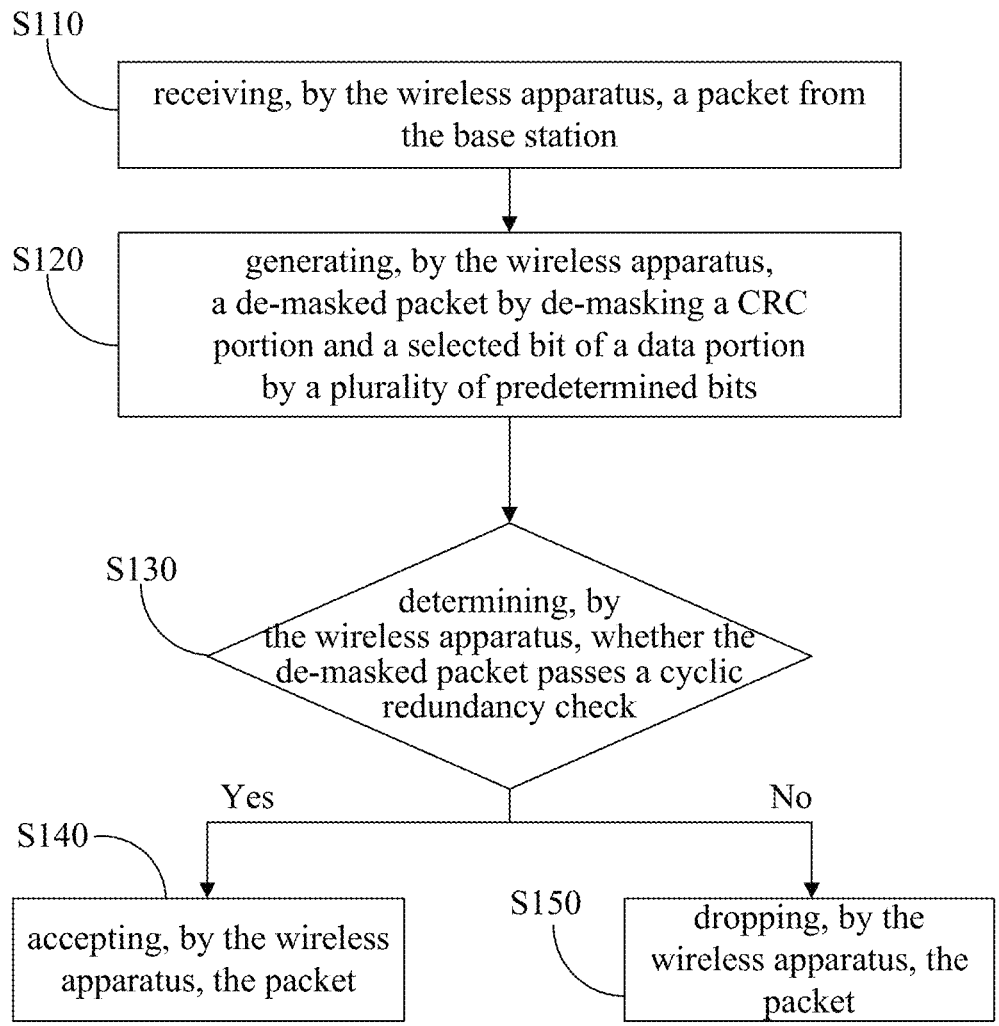
FIG. 5 is a flowchart diagram of a first embodiment of the method according to the present invention.

Referring to FIG. 5, there is shown a flowchart diagram of a first embodiment of the method for de-masking a packet according to the present invention. The method for de-masking the packet is suitable for use in a wireless apparatus, such as the wireless apparatus 10 in the aforesaid embodiments. Firstly, step S110 is executed by the wireless apparatus for receiving the packet from the base station, wherein the packet comprises a data portion and a CRC portion. Next, step S120 is executed by the wireless apparatus for generating a de-masked packet by de-masking the CRC portion and a selected bit of the data portion by a plurality of predetermined bits. Then, step S130 is executed by the wireless apparatus for determining whether the de-masked packet passes a cyclic redundancy check. If the determination result in the step S130 is "yes", then step S140 is executed by the wireless apparatus for accepting the packet. Otherwise, if the determination result in the step S130 is "no", then step S150 is executed by the wireless apparatus for dropping the packet.

It is noted that the packet received by the wireless apparatus is created and transmitted by the base station. Preferably, a selected position in the data portion for placing the selected bit is chosen based on a selection procedure. In the selection procedure, the selected bit at the selected position can be 0 or 1 and the bits in the rest positions are set to be 0. Hence, given one selected position, there are 2 possible bit streams. Then, the selection procedure further derives 2 redundancies by applying a CRC polynomial to each of the possible bit streams. The derived redundancies form a first vector space. In the selection procedure, a second vector space is further formed by a plurality of redundancies by applying the CRC polynomial to each of all possible bit streams in the CRC portion. It is noted that the first vector space and the second vector space do not overlap.

Figure 6:
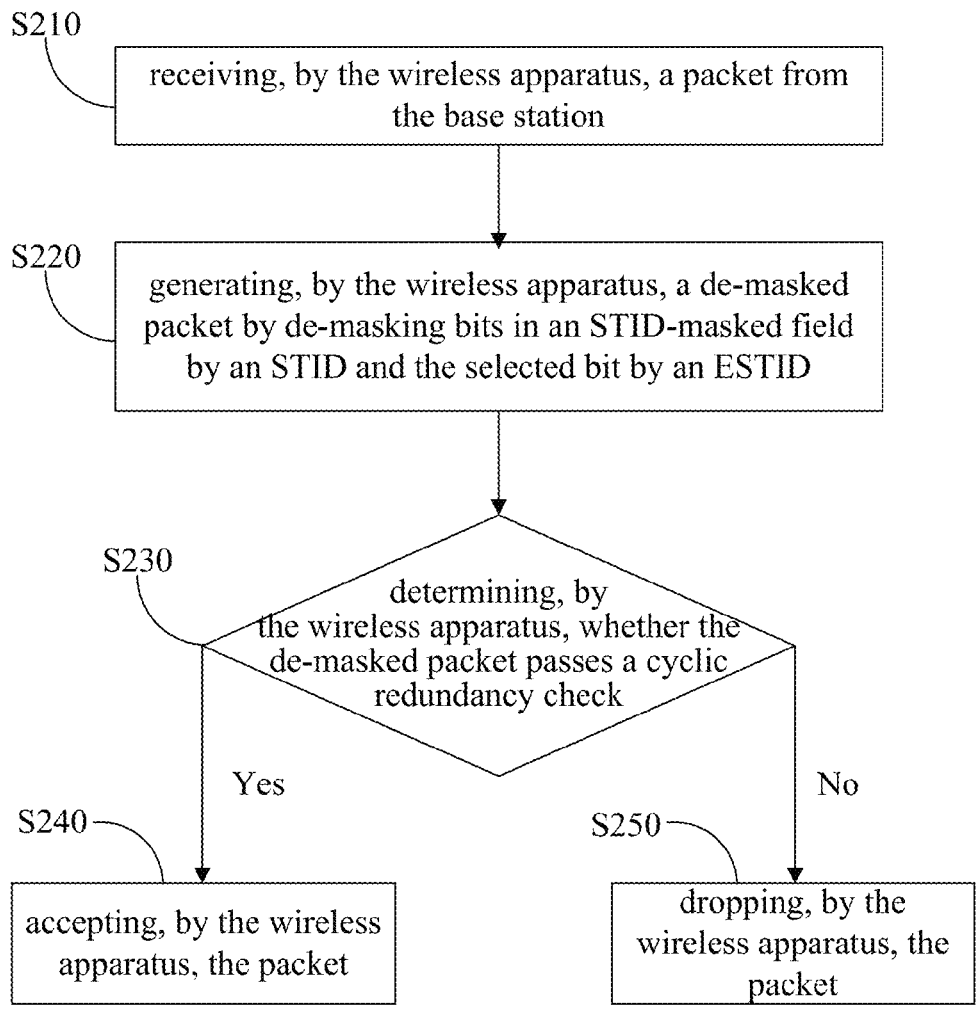
FIG. 6 is a flowchart diagram of a second embodiment of the method according to the present invention.

Referring to FIG. 6, there is shown a flowchart diagram of a second embodiment of the method for de-masking a packet according to the present invention. Steps S210, S230, S240, and S250 in this embodiment are essentially the same as the steps S110, S130, S140, and S150 in the previous embodiment respectively, so the details will not be further described again herein.

The difference between this and previous embodiments is the structures of the packets received by the wireless apparatus. In this embodiment, the CRC portion of the packet is defined with an STID-masked field, which comprises a plurality of bits. In addition, the wireless apparatus has an identity comprising an STID and an ESTID. Step S220 in this embodiment is executed after the step S210 and before the step S230. The step S220 is executed by the wireless apparatus for generating a de-masked packet by de-masking the bits in the STID-masked field of the CRC portion by the STID of the wireless apparatus and de-masking the selected bit of the data portion by the ESTID of the wireless apparatus.

Figure 7:
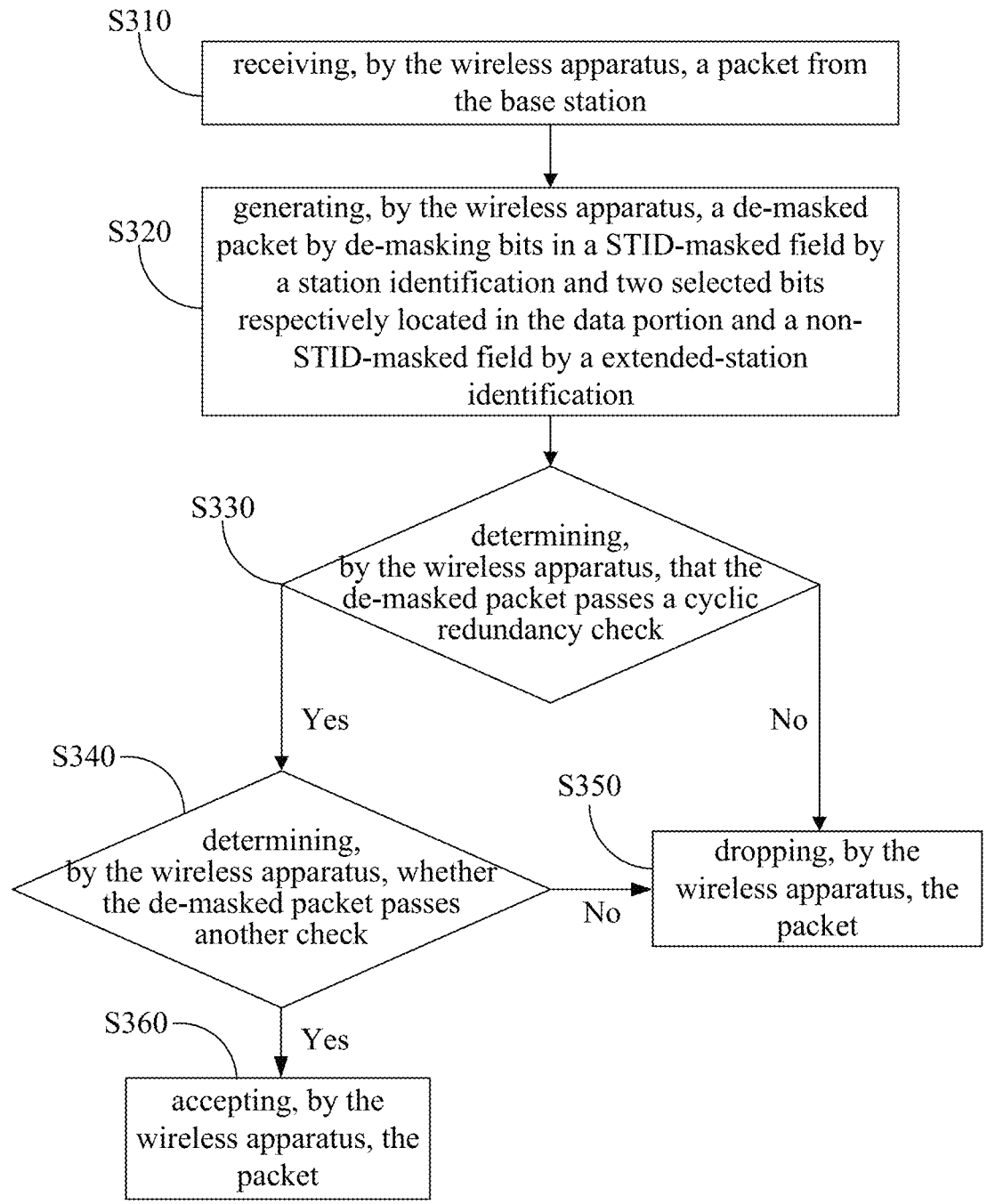
FIG. 7 is a flowchart diagram of a third embodiment of the method according to the present invention.

Referring to FIG. 7, there is shown a flowchart diagram of a third embodiment of the method for de-masking a packet according to the present invention. In this embodiment, the wireless apparatus has an identity comprising an STID and an ESTID. In addition, the CRC portion is defined with an STID-masked field and a non-STID-masked field, wherein the STID-masked field comprises a plurality of bits and the non-STID-masked field comprises at least one bit. In this embodiment, in addition to bits in the STID-masked field of the CRC portion, a first selected bit in the data portion and a second selected bit in the non-STID-masked field are selected for masking and de-masking as well. The method for de-masking a packet is suitable for use in the wireless apparatus and comprises the following steps.

Firstly, step S310 is executed by the wireless apparatus for receiving the packet from the base station. Next, step S320 is executed by the wireless apparatus for generating a de-masked packet by de-masking bits in the STID-masked field by the STID of the wireless apparatus and de-masking the first selected bit in the data portion and the second selected bit in the non-STID-masked field by the ESTID of the wireless apparatus. Then, step S330 is executed by the wireless apparatus for determining whether the de-masked packet passes a cyclic redundancy check.

The selected positions of the first selected bit and the second selected bit are chosen based on a selection procedure. In the selection procedure, each of the first selected bit and the second selected bit can be 0 or 1 and the bits in the rest positions are set to be 0. Therefore, given two selected positions, there are $2^2$ possible bit streams. The selection procedure further derives $2^2$ redundancies by applying a cyclic redundancy check polynomial to each of the possible bit streams. The redundancies form a first vector space. In the selection procedure, a second vector space is further formed by a plurality of redundancies by applying the CRC polynomial to each of all possible bit streams in the CRC portion. It is noted that the first vector space and the second vector space do not overlap.

In cases the first vector space is partially overlapped with the second vector space, another check for the packet is required. The another check procedure requires additional information. Specifically, the data portion in this embodiment further comprises a type field at the beginning of the packet for indicating that an attribution of the packet is unicast or multicast. The type field may be of 4 bits, wherein the content of the 4-bit type field is in a range of 0000~0100 and the length of the packet is 23 bits for unicast, and the content of the type field is in a range of 0101~4000 and the length of the packet is 21 bits for multicast.

Therefore, if the determination result in the step S330 is "no", then step S350 is executed by the wireless apparatus for dropping the packet. Otherwise, if the determination result in the step S330 is "yes", step S340 is executed for another checking. Specifically, step S340 is executed by the wireless apparatus for determining whether the de-masked packet passes the another check according to a length of the packet and/or a content of the type field. If the determination result in the step S340 is "yes", step S360 is executed by the wireless apparatus for accepting the packet. Otherwise, if the determination result in the step S340 is "no", then step S350 is executed by the wireless apparatus for dropping the packet.

According to the above descriptions, it is learned that the method of the present invention de-masks a packet not only to the bits in the CRC portion but also to the at least one selected bit in the data portion by the predetermined bits. Moreover, additional bits, such as bits in the non-STID-masked field of the CRC portion, can be used for de-masking as well. The another check may be further applied after the process of de-masking. Since de-masking is not limited to bits in the CRC portion, the network system is able to accommodate more wireless apparatuses comparing to prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for de-masking a packet, the method being used in a wireless apparatus of a network system, the network system comprising a base station and the wireless apparatus, the method comprising the steps of:

receiving, by the wireless apparatus, the packet from the base station, the packet comprising a data portion and a cyclic redundancy check portion;

generating, by the wireless apparatus, a de-masked packet by de-masking the cyclic redundancy check portion and at least one selected bit of the data portion by a plurality of predetermined bits;

determining, by the wireless apparatus, that the de-masked packet passes a cyclic redundancy check; and accepting, by the wireless apparatus, the packet;

wherein the data portion has at least one selected position for placing the at least one selected bit, the at least one selected position corresponds to a plurality of possible bit streams, a first vector space is formed by a plurality of redundancies by applying a cyclic redundancy check polynomial to each of the possible bit streams, a second vector space is further formed by a plurality of redundancies by applying the CRC polynomial to each of all possible bit streams in the CRC portion, and the first vector space and the second vector space do not overlap.

2. The method of claim 1, wherein the cyclic redundancy check portion is defined with a station identification masked field, the station identification masked field comprises a plurality of bits, and the method de-masks the bits in the station identification masked field by a station identification of the wireless apparatus and de-masks the at least one selected bit in the data portion by an extended-station identification of the wireless apparatus.

3. The method of claim 1, wherein the cyclic redundancy check portion is defined with a station identification masked field and a non-station identification masked field, the station identification masked field comprises a plurality of bits, the non-station identification masked field comprises at least one bit, and the method de-masks the bits in the station identification masked field by a station identification of the wireless apparatus and de-masks the at least one selected bit in the data portion and the at least one bit in the non-station identification masked field by an extended-station identification of the wireless apparatus.

4. A wireless apparatus for a network system, the network system comprising a base station and the wireless apparatus, the wireless apparatus comprising:

a receiving unit for receiving a packet from the base station, wherein the packet comprises a data portion and a cyclic redundancy check portion; and a processing unit, electronically connected to the receiving unit and is configured for generating a de-masked packet by de-masking the cyclic redundancy check portion and at least one selected bit of the data portion by a plurality of predetermined bits, determining that the de-masked packet passes a cyclic redundancy check, and then accepting the packet after the determination;

wherein the data portion has at least one selected position for placing the at least one selected bit, the at least one selected position corresponds to a plurality of possible bit streams, a first vector space is formed by a plurality of redundancies by applying a cyclic redundancy check polynomial to each of the possible bit streams, a second vector space is further formed by a plurality of redundancies by applying the CRC polynomial to each of all possible bit streams in the CRC portion, and the first vector space and the second vector space do not overlap.

5. The wireless apparatus of claim 4, wherein the cyclic redundancy check portion is defined with a station identification masked field, the station identification masked field comprises a plurality of bits, the processing unit de-masks the bits in the station identification masked field by a station identification of the wireless apparatus, and the processing unit de-masks the at least one selected bit in the data portion by an extended-station identification of the wireless apparatus.

6. The wireless apparatus of claim 4, wherein the cyclic redundancy check portion is defined with a station identification masked field and a non-station identification masked field, the station identification masked field comprises a plurality of bits, the non-station identification masked field comprises at least one bit, and the processing unit de-masks the bits in the station identification masked field by a station identification of the wireless apparatus and de-masks the at least one selected bit in the data portion and the at least one bit in the non-station identification masked field by an extended-station identification of the wireless apparatus.

* * * * *